J. HOWARTH,
Assignor, by mesne assignments, to THE CARBON BLACK CO.
Manufacture of Carbon Black.
No. 9,697. Reissued May 10, 1881.
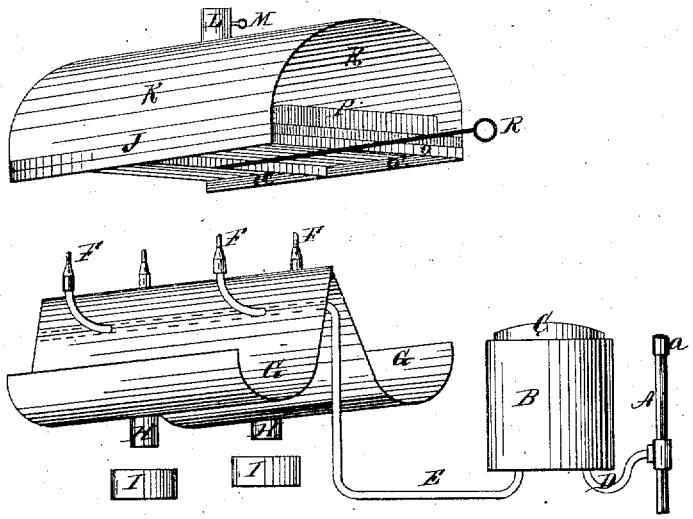
WITNESSES: John Howarth INVENTOR:
F. W. Smith
John F. C. Preinkert
BY Wm. C. R. W. Entir ATTORNEY.

UNITED STATES PATENT OFFICE.

JOHN HOWARTH, OF NEW CUMBERLAND, W. VA., ASSIGNOR, BY MESNE ASSIGNMENTS, TO THE CARBON BLACK COMPANY, OF NEW YORK, N. Y.

MANUFACTURE OF CARBON-BLACK

SPECIFICATION forming part of Reissued Letters Patent No. 9,697, dated May 10, 1881.

Original No. 131,446, dated September 17, 1872; Reissue No. 6,937, dated February 22, 1876. Application for reissue filed September 9, 1880.

DIVISION B.

*To all whom it may concern:*

Be it known that I, JOHN HOWARTH, of New Cumberland, in the county of Hancock and State of West Virginia, have made an invention of a new and useful Apparatus for the Manufacture of Carbon-Black; and I do hereby declare the following to be a full, clear, and exact description thereof, reference being had to the accompanying drawing, which is a perspective view of the apparatus.

By my invention I am enabled to utilize the carbureted hydrogen gas which escapes in considerable quantities from the wells sunk in the earth in the attempt to obtain petroleum or hydrocarbon oil, this gas having heretofore been allowed usually to go to waste, the result of this utilization being a superior carbon-black.

In the drawing, A represents the upper portion of the tube of a tubular well. This tube is provided with a safety-valve, *a*, which permits the gas to escape when the pressure exerted by it upon the receiver is too great.

B represents a reservoir composed of a suitable material and containing a quantity of water or oil, upon which a bell-float, C, is placed, after the manner of ordinary gas-reservoirs. The well-tube A communicates with the interior of the vessel B by a suitable pipe, D. Extending from the receiver B to a suitable locality is a second pipe, E, which terminates in a horizontal extension, upon which are placed a series of gas-burners, F F, &c., in such number as may be found desirable. Below each burner or set of burners I dispose a curved apron or trough, G, from the bottom of which one or more discharge pipes or ports, H H, extend, the outlet of each pipe being situated immediately over a movable box or receptacle, I, placed below them.

In order to intercept the flame issuing from each burner and collect the carbon resulting from the partial combustion thereof, I employ a slab or tile, J, of soapstone or other suitable material, which I dispose horizontally over the series of burners, this slab being pierced with a number of orifices to permit the passage of an excess of smoke. As a high temperature of the slab J would impair the color of the carbon-black deposited upon it, I construct upon its upper side a closed pan or vessel of water, P, to reduce its temperature, such water being constantly renewed, the tile being covered with a suitable dome or roof, K, disposed as shown in the drawing, this dome or roof being provided with a ventilating pipe, L, in which is placed a damper, M.

Below the slab or tile J, I dispose one or more horizontal scrapers, O O, &c., these scrapers being supported and sliding in horizontal grooves or ways *a' a'*, formed in the lower part and on opposite sides of the dome K.

In practice I prefer that a scraper should be provided for each pair of burners, in order that a short movement of the handle or rod R, which connects them, may suffice to scrape the entire under surface of the slab J.

The operation of the apparatus is as follows: The gas, issuing from the tube A under considerable pressure, passes through the pipe D and into the reservoir B, from whence it passes into the pipe E and burners F F, &c. The gate of each burner is opened and the gas lighted, each flame being intercepted by the soapstone slab J, which is located immediately over them. The carbon resulting from the imperfect combustion of the gas is deposited upon the under side of the slab J, from which it is to be detached by the scrapers O O, &c., and precipitated into the troughs G G, from whence it is delivered through the ports H H to the vessels I I, which are to be emptied into a suitable receiver as often as necessary. Any particles of carbon-black which may escape upwardly through the perforations of the slab J will enter the chamber or dome K and be deposited upon the cover of the pan P or other parts of the chamber.

The safety-valve *a* provides a means of disposing of such portion of the gas issuing from the well-tube as is not required at the burners.

I am aware that apparatuses have been used for some time for the manufacture of carbon-black from oils, tar, resin, and similar carbonaceous liquids and solids—for instance, the apparatus of Adolph Millochau, patented in the United States December 10, 1867, No. 72,068.

In all such devices, however, an open pan or fire-pot has been used, in which the oil or solid carbonaceous material was burned. My invention is not this, but relates to an apparatus by which carbureted hydrogen gas, as it issues from the earth in its natural state, as well as other gases, can be practically manufactured into a carbon-black.

Having thus described my invention, I desire to claim, in an apparatus for making carbon-black from natural carbureted hydrogen gas, the following combinations, to wit:

1. The combination of a gas-carrying tube provided with a safety-valve, a reservoir with its float to receive the gas, a pipe to convey the gas from the reservoir to the series of gas-burners, the series of gas-burners themselves, a collecting-plate, a scraper or scrapers to remove the carbon from the collecting-plate, and a receptacle or receptacles to receive the carbon-black, substantially as and for the purpose set forth.

2. The combination of a tube to convey the gas to a series of gas-burners, the series of gas-burners themselves, a collecting-plate, a scraper or scrapers to remove the carbon-black from the collecting-plate, and a receptacle or receptacles to receive the carbon, substantially as and for the purposes set forth.

3. The combination of a tube to convey the gas to the series of gas-burners, the series of gas-burners themselves, a collecting-plate, a cooling-pan to keep down the temperature of the collecting-plate, a scraper or scrapers to remove the carbon-black from the collecting-plate, and a receptacle or receptacles to receive the carbon-black removed by the scrapers, substantially as and for the purposes set forth.

4. The combination of a tube to convey the gas to the series of gas-burners, the series of gas-burners themselves, and a collecting-plate arranged over the series of gas-burners to receive the deposit, substantially as hereinbefore set forth.

5. The combination of a tube to convey the gas to the series of gas-burners, the series of gas-burners themselves, the collecting-plate arranged over the series of gas-burners to receive the deposit, and the dome to collect any ascending particles of carbon-black, substantially as described.

JOHN HOWARTH.

Witnesses:
A. G. WILLIAMS,
ALEX. MITCHELL.